United States Patent

Sassa et al.

[11] Patent Number: 5,096,473
[45] Date of Patent: Mar. 17, 1992

[54] FILTRATION FABRIC LAMINATES

[75] Inventors: Robert Sassa, Newark; Todd Johnson, Wilmington, both of Del.; Richard Winkelmayer, North East, Md.

[73] Assignee: W. L. Gore & Associates, Inc., Newark, Del.

[21] Appl. No.: 662,871

[22] Filed: Mar. 1, 1991

[51] Int. Cl.⁵ .............................. B01D 29/17
[52] U.S. Cl. .................................... 55/97; 55/302; 55/486; 55/514; 55/528
[58] Field of Search ................. 55/96, 97, 302, 486, 55/487, 514, 528

[56] References Cited

U.S. PATENT DOCUMENTS

| | | |
|---|---|---|
| 3,951,293 | 4/1976 | Schulz ............... 55/528 X |
| 3,962,153 | 6/1976 | Gore ................. 55/528 X |
| 4,025,679 | 5/1977 | Denny ............... 55/528 X |
| 4,187,390 | 2/1980 | Gore ................. 55/528 X |
| 4,190,426 | 2/1980 | Ruschke ............. 55/528 X |
| 4,238,207 | 12/1980 | Ruschke ............. 55/514 X |
| 4,322,385 | 3/1982 | Goetz ............... 55/487 X |
| 4,324,574 | 4/1982 | Fagan ............... 55/528 X |
| 4,668,258 | 5/1987 | Steer ............... 55/528 X |
| 4,689,059 | 8/1987 | Magdelain .......... 55/528 X |
| 4,774,001 | 9/1988 | Degen et al. ....... 55/528 X |
| 4,816,328 | 3/1989 | Saville et al. ..... 55/528 X |
| 4,877,433 | 10/1989 | Oshitari ........... 55/487 X |
| 4,902,423 | 2/1990 | Bacino ............. 55/528 X |
| 4,983,434 | 1/1991 | Sassa .............. 55/528 X |
| 5,019,140 | 5/1991 | Bowser et al. ...... 55/486 X |

FOREIGN PATENT DOCUMENTS 2157586 10/1985 United Kingdom ............. 55/528

Primary Examiner—Robert Spitzer
Attorney, Agent, or Firm—Gary A. Samuels

[57] ABSTRACT

A filter composite is made of a porous polytetrafluoroethylene (PTFE) and a fabric. The PTFE and fabric are bonded by an adhesive. The adhesive is prevented from penetrating the fabric by employing a coating of an oil and water-repellent material to the surface of the fabric adjacent the adhesive.

7 Claims, 2 Drawing Sheets

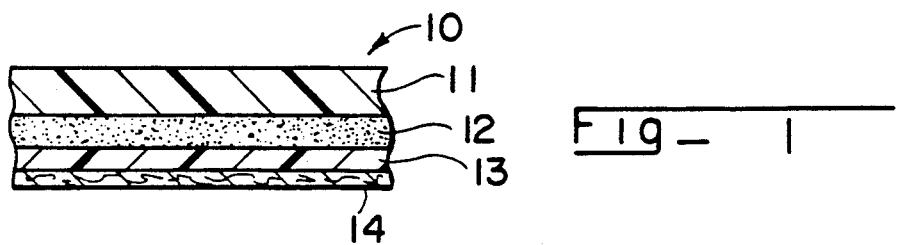
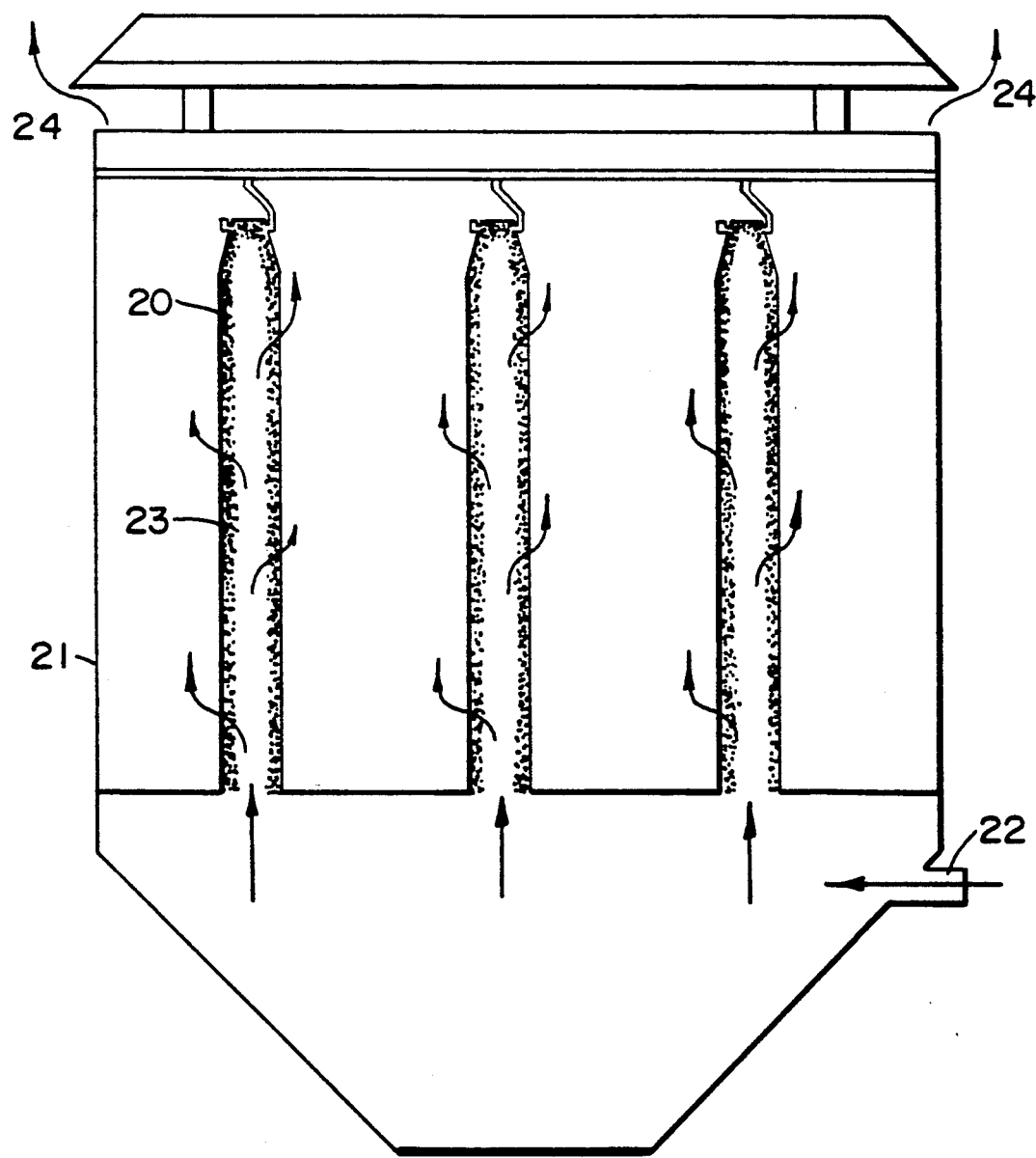

FILTRATION FABRIC LAMINATES

FIELD OF THE INVENTION

This invention relates to membrane laminates useful as filters in filtration of solids from fluid streams as, for example, in industrial gas streams.

BACKGROUND OF THE INVENTION

Fabric filters are often used to separate solid particulate from an industrial fluid stream. As the textile based filter media accumulates particulate, its resistance to the flow of the fluid increases. When this resistance becomes significant, the filter must be rejuvenated by removing the particulate using one of several methods. The most common types of cleaning are pulse jet, reverse air, and shaker.

The pulse jet technique uses a short duration pulse of compressed air. The blast of air is fired into the open top of the bag. The high speed air mass violently expands the filter. The bag then implodes against its cage and goes back into filtering service. During this rapid movement, the accumulated dust cake is released from the filter to fall into the hopper for removal.

The reverse air systems employ a low flow of air from the clean side to the dust side. The entire compartment must be isolated from forward air flow during the cleaning period. the backwash of air collapses the bag. The fractured dust cake is flushed through the open bottom to the collection hopper.

Shaker cleaning mechanisms are also used with filter bags that collect dust on the inside. The closed top of the bag is attached to an oscillating arm. The sinusoidal wave induced dislodges the dust cake in the bag which then falls through the open bottom to the hopper. The compartment of bags is removed from filtering service during this cleaning cycle.

Shaker bag houses are used throughout the world in all sorts of industrial filtration applications. Applications range from the collection of powdered milk product, to the emissions control capture of fine dust from large furnaces in the metal refining industry. Most of these collectors use lightweight 0.13–0.33 Kg/m$^2$ (4–10 oz/yd$^2$) woven filter medias.

One of the primary modes of failure for these filters, when used in metals and minerals applications, is hydrolysis degradation from acids and moisture in the gas streams. Thus, woven polyacrylonitrile (PAN) materials can be used to improve chemical resistance.

Conventional woven polyester and acrylic fabrics, are poor filter medias by themselves so a primary dust cake must be built up on the surface of the filtration media. The cake improves the efficiency of the filter as compared to a clean filter, but the cake also increases the pressure drop across the filter. Even with the shaker cleaning mechanism described above, the bags do not release all the dust that has collected on the bag. Over time this entrapped layer of dust becomes thick enough that even after the shaking cycle enough dust remains on the bag to cause the pressure drop across the filter to be high. This increased pressure drop leads to processing problems so the cake must be cleaned from the bag. The bags must be removed and either laundered or replaced. The clean bags then have the same emissions problems that new bags have. The bag house will be inefficient until a new dust cake has built up on all of the bags.

Membrane laminate filter medias have gained increasing recognition for their improved filtering performance. No primary cake is needed to reduce emissions to near zero levels, and nearly all the dust that is collected is removed with every shaking cycle, which helps maintain a consistently low pressure drop across the laminate throughout the life of the bag. Two layer laminates of porous expanded polytetrafluoroethylene (PTFE) membranes and a variety of different backings have been used. A few examples are: in high temperature pulse jet applications fiberglass backings have been used, in low temperature pulse jet applications polyester felt backings have been used. Felted acrylic or felted PTFE backings have also been used in pulse jet applications where hydrolysis could be a potential problem. In low energy cleaning filtration systems (shakers and reverse air) woven polyester fabric has been used as a backing.

Recently there has been a growing need for a high efficiency, low temperature (below 135° C.), chemically resistant, low energy cleanable filter media. A laminate containing expanded porous PTFE membrane will satisfy most of these criteria, but one difficulty is in finding a backing that is suitable for low energy cleaning in a chemically harsh environment. Such a need can be fulfilled with a laminate of an expanded porous PTFE membrane and a woven acrylic fabric.

When thermosetting fibers are used as the backing, an adhesive system is needed. Adhesives can be also advantageous in the lamination process even with thermoplastic textile backings because bonding to thermoplastic fibers can significantly degrade the quality of the laminate. While use of adhesives is necessary to provide good bonding, their use also presents some problems. Shaker cleaning systems rely on flexible, permeable bags, and often adhesives detract from these properties. For example, powder coating adhesive techniques can produce a non-uniform adhesive coating which results in a material with inconsistent permeability. Powder also permits adhesive media migration which potentially can contaminate the clean air side of the filter media. Solvent free adhesives are subject to chemical attack and thus these laminates are not suitable for harsh chemical environments. Liquid adhesives tend to be drawn into the fabric by capillary action, and the hydrophilic nature of some backing fibers. This leads to an inadequate amount of adhesive on the surface to produce sufficient bonding with the membrane. It also leads to a stiff laminate because the spun and filament yarns become bound. This wicking action can be avoided by adding adhesive thickeners but then chemical inferiority and long term adhesive performance are compromised.

SUMMARY OF THE INVENTION

The laminates of this invention are designed to solve the above described adhesive problems and provide flexible laminates.

In the present invention, an expanded porous polytetrafluoroethylene (PTFE) membrane is adhered by an adhesive to fabric of a synthetic polymer that has an oil and water resistant polymer present in a manner which prevents the adhesive from substantially wicking into the fabric and in such a way that the substrate remains flexible.

BRIEF DESCRIPTION OF THE DRAWINGS

FIG. 1 depicts a cross-section of a representative laminate 10 of the invention.

FIG. 2 depicts a cross-section side view of a baghouse with filter cakes on the bag walls.

DESCRIPTION OF THE INVENTION

Figure 3:
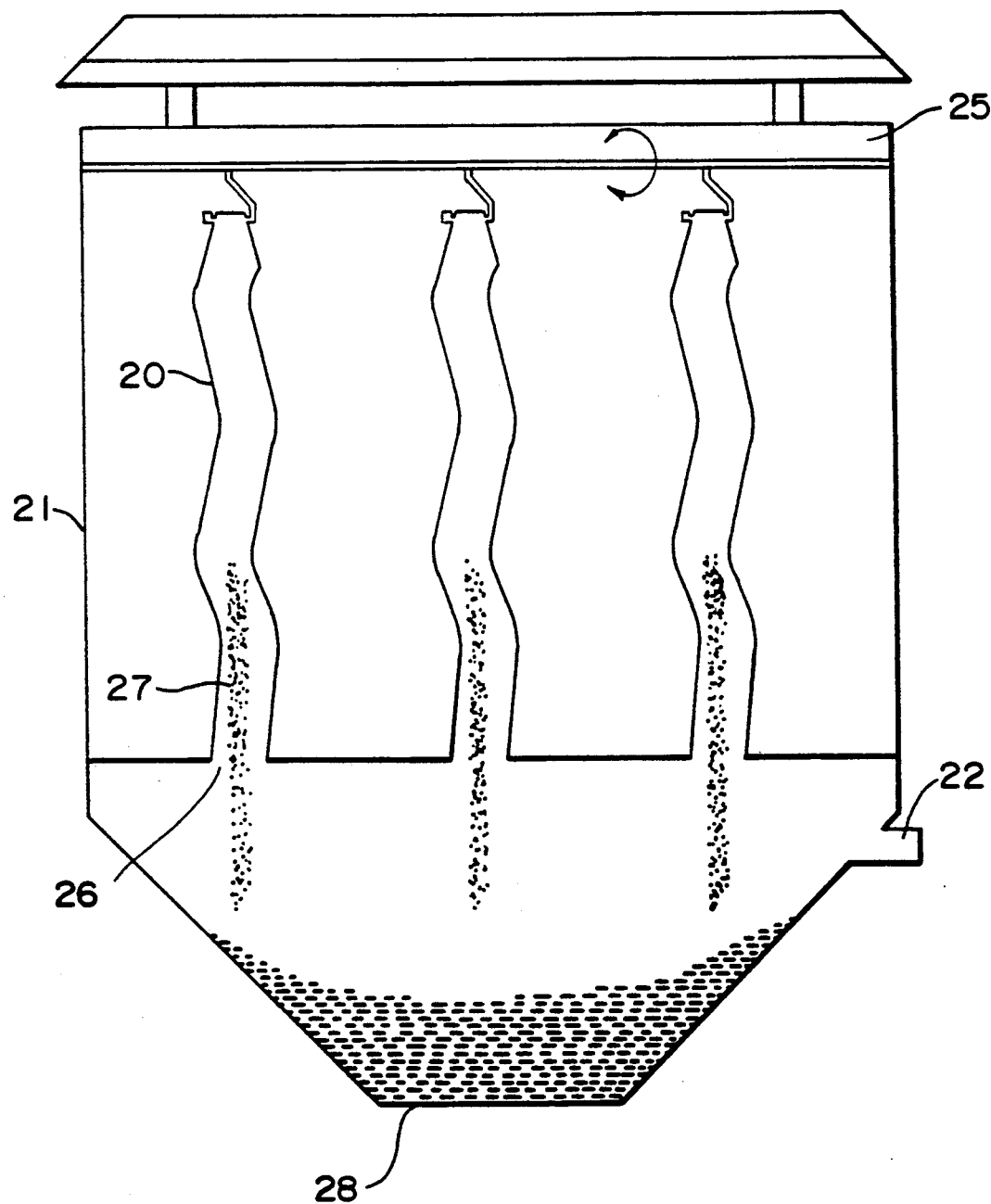
FIG. 3 depicts a cross-section side view of a baghouse in which the filter cakes are being shaken loose.

Referring to FIG. 1, the invention employs a porous polytetrafluoroethylene (PTFE) membrane 11. The membrane can be prepared by a number of different known processes, but is preferably prepared by expanding polytetrafluoroethylene as described in U.S. Pat. Nos. 4,187,390; 4,110,239; and 3,953,566 to obtain expanded polytetrafluoroethylene. By "porous" is meant that the membrane has an air permeability of at least 0.05 cubic meters per minute per square meter (m/min) at 20 mm water gauge. Membranes with air permeabilities of 200 m/min at 20 mm water or more can be used. The pores are micropores formed by the nodes and fibrils of the expanded PTFE.

The membrane preferably has an air permeability of at least 7.7 m/min at 20 mm water gauge, (16 Frazier Number), for use in gas stream filtration. Lower air permeability membranes are useful in liquid stream applications, generally 0.48 to 4.80 m/min at 20 mm water gauge (1 to 10 Frazier Numbers).

The textile substrate 14 to which membrane 11 is laminated can be a variety of different fabrics, such as, aramid, copolyimide, polyimides, modacrylic, polyester, polypropylene but preferably is a polyacrylonitrile (PAN) fiber woven into a three by one (3×1) twill, which weighs between 0.2 to 0.3 Kg/m². The fabric can be woven, knit, nonwoven, or the like.

Different weight fabrics may be used by changing the weave, the denier of the yarns, or the thread counts.

Treating the textile substrate 14 with an oil and water resistant polymer 13 prior to applying adhesive coating 12 is important to production of a laminate 10 that remains flexible. The surface free energy of the fabric is reduced with such a repellency treatment. Presence of the oil and water resistant material causes the adhesive to "bead up" on the surface, and prevents the adhesive from entering the capillaries in the textile. The coated fabric can be subjected to heat to evaporate any water in the adhesive, leaving behind only the adhesive particles on the surface.

The oil and water resistant polymer can be a variety of fluoropolymers. Fluoropolymers with acrylic, urethane, or other units in the backbone that have fluorinated organic (preferably alkyl) side chains form a film around fibers that impart water and oil resistant properties. Commercially available oil and water resistant polymers include Zepel ® fluoropolymer, Teflon AF ® fluoropolymers and Milease ® or ScotchGard ® water/oil repellants. The polymers are applied such that the air permeability of the fabric is not impeded to any substantial extent.

The adhesive used to laminate the porous expanded PTFE membrane to the fabric can be a variety of fluorochemical dispersions or synthetic latexes. Preferably, the adhesive should have similar or better chemical resistance and thermal resistance properties than those of the yarns used in the weaving of the fabric. Possible adhesive systems include aqueous anionic dispersions of:

1. butadiene acrylonitrile copolymers
2. copolymers based on acrylic esters
3. vinyl and vinylidene chloride polymers and copolymers produced by emulsion polymerization
4. styrene-butadiene copolymers
5. terpolymers of butadiene, styrene, and vinyl pyridine All of these produce adequate bonding of membrane to material while keeping the entire laminate highly chemically resistant. Different methods of coating the material with adhesive before lamination can be used. But regardless what method of coating is used, the oil and water resistant polymer prevents the adhesive from wicking into the fabric. If the wicking action is not prohibited, the fabric becomes much stiffer than raw fabric once the adhesive cures. The adhesive is not applied so as to substantially impede the air permeability of the composite.

Once the fabric has been treated and coated with adhesive, the expanded porous PTFE membrane is placed onto the adhesive side of the coated fabric. Conductive heat and ample pressure are applied to the membrane side to cause the adhesive to flow into the membrane pores. If the adhesive is cross-linkable, the adhesive cross-links due to the heat and results in a mechanical attachment of the membrane to the substrate. The cross-linked adhesive is thermally and chemically stable enough to survive the rigors of the bag house environment which typically entail several years at temperatures up to 127° C. in the presence of corrosive gasses like HCL, HF, and $H_2SO_4$.

In operation, laminate 10 can be formed into a filter bag for use in baghouse operations. Referring to FIGS. 2 and 3, in FIG. 2, laminate 10 is formed into a filter bag, depicted as 20 in FIGS. 2 and 3. A series of such bags are placed in enclosure 21, which is commonly called a baghouse. Dirty air enters the baghouse at entrance 22 and passes upward into the bags 20. Air passes through the bag, leaving a cake 23 of particulate (FIG. 2) on the walls of the bag. Clean air then passes out exit 24.

To clean the cake 23 off the bag, shaker arm 25 is operated. This sets up an undulating motion in the bags (shown in FIG. 3) thus dislodging cake 23 causing it to fall out the open bottom 26 of bag 20. The falling cake particles are depicted as 27. The particles fall to the bottom and are removed through hopper 28.

EXAMPLE

A polyacrylonitrile yarn was woven into 3×1 twill weave with multi-filament yarns in the machine direction and spun yarns in the cross machine direction. The fabric had a thread count of 76×70 threads per inch, and weighed 0.189 Kg/m² (5.6 ounces per square yard).

A 15 cm by 15 cm swatch of this fabric was coated with a water repellent. An aerosol can of ScotchGard ® fabric protector was sprayed onto the swatch until the fabric was virtually saturated. The wet sample was then placed in an oven at 100° C. for 5 minutes. After cooling the coating add-on was measured to be 5.5% by weight.

The treated swatch was then coated with adhesive. An aqueous acrylic latex solution with 25% total solids was sprayed on the swatch using a pressurized hand spray gun. This coating was dried overnight at ambient conditions. The adhesive coating add-on was measured to be 2.75% by weight.

The coated fabric was then combined with a piece of porous expanded PTFE membrane having an air permeability of 8.64 m/min at 20 mm water gauge (18 cfm/ft$^2$ at 0.5 inches water gauge) so that the membrane contacted the coated surface. The resulting swatch was placed in an aluminum foil envelope then placed in a hydraulic press with heated platens. The sample was placed in the press so the fabric side rested on an ambient temperature platen. Another platen, which was heated to 215° C. (420° F.), was pressed against the membrane side. The platens were closed and pressurized to 287 KPa (1500 lbs. over the 6"×6" area). After a 0.2 minute dwell time the press was opened and the sample was removed from the aluminum foil envelope. The resulting laminate had good bonding between the acrylic fabric and the PTFE membrane. The laminate could withstand 48.2 KPa (7 psi) hydrostatic pressure from the fabric side without leaking. The mechanical strength of the laminate was greater than raw fabric, yet the laminate was still supple and could easily be sewn into filter bags. The laminate weighed 0.2 Kg/m$^2$ (5.8 oz/yd$^2$) and was 0.38 mm (0.15 inches) thick. The air permeability of the laminate was 3.26 m/min at 20 mm water gauge (6.8 cfm/ft$^2$ at 0.5 inches (1.27 cm) water gauge).

Air permeability data is obtained by subjecting the sample to be tested to an air flow and noting the air velocity that is needed to register 0.5 (1.27 cm) inches on a pressure water gauge.

I claim:

1. A porous composite comprising a layer of porous polytetrafluoroethylene adhered by an adhesive to fabric of a synthetic polymer that has an oil and water resistant polymer present in a manner which prevents adhesive from substantially wicking into the fabric.

2. The porous composite of claim 1 wherein the synthetic polymer is a thermoset polymer.

3. The porous composite of claim 1 wherein the synthetic polymer is polyacrylonitrile.

4. The porous composite of claims 1, 2, or 3 wherein the oil and water-resistant polymer comprises a coating between the adhesive and the fabric.

5. The porous composite of claims 1, 2, or 3 wherein the oil and water-resistant polymer permeates the fabric.

6. The porous composite of claim 1 in the form of a filter bag.

7. Process for filtering particulate from an air stream which comprising forming a filter bag from the porous composite defined in claim 1, placing the bag in an enclosure for filtering air, and passing air through the bag.

* * * * *